United States Patent
Wu et al.

(10) Patent No.: US 11,628,047 B2
(45) Date of Patent: Apr. 18, 2023

(54) OPERATING INTRAORAL SCANNER CAPABLE OF CONSTRUCTING ACCURATE DENTAL MODEL AND METHOD THEREOF

(71) Applicant: QISDA CORPORATION, Taoyuan (TW)

(72) Inventors: Chuang-Wei Wu, Taoyuan (TW); Hung-Chih Chan, Taoyuan (TW)

(73) Assignee: Qisda Corporation, Taoyuan (TW)

( * ) Notice: Subject to any disclaimer, the term of this patent is extended or adjusted under 35 U.S.C. 154(b) by 254 days.

(21) Appl. No.: 17/191,640

(22) Filed: Mar. 3, 2021

(65) Prior Publication Data
US 2021/0290348 A1    Sep. 23, 2021

(30) Foreign Application Priority Data

Mar. 20, 2020    (CN) .......................... 202010203554.7

(51) Int. Cl.
*A61C 9/00* (2006.01)
*A61C 7/00* (2006.01)
*A61C 13/34* (2006.01)

(52) U.S. Cl.
CPC ............ *A61C 9/0053* (2013.01); *A61C 7/002* (2013.01); *A61C 13/34* (2013.01); *A61C 2007/004* (2013.01)

(58) Field of Classification Search
CPC ....... A61C 9/0053; A61C 7/002; A61C 13/34; A61C 2007/004; A61C 9/006; H04N 5/232411; H04N 5/2256; H04N 2005/2255
See application file for complete search history.

(56) References Cited

U.S. PATENT DOCUMENTS

| | | | |
|---|---|---|---|
| 10,200,572 B1* | 2/2019 | Fotland | G06T 7/246 |
| 2011/0273546 A1* | 11/2011 | Lin | G06V 10/507 |
| | | | 348/E5.04 |
| 2018/0168781 A1* | 6/2018 | Kopelman | A61C 19/04 |
| 2018/0263733 A1* | 9/2018 | Pokotilov | A61C 7/002 |
| 2018/0296080 A1* | 10/2018 | Glinec | A61B 1/24 |
| 2019/0350680 A1* | 11/2019 | Chekh | G06T 19/006 |
| 2020/0360109 A1* | 11/2020 | Gao | G06T 7/0012 |
| 2021/0012554 A1* | 1/2021 | Leonardi | G06T 9/00 |
| 2021/0018318 A1* | 1/2021 | Sasaki | G02B 26/10 |
| 2021/0029289 A1* | 1/2021 | Totsuka | A61B 1/00036 |

* cited by examiner

*Primary Examiner* — Nicholas D Lucchesi

(57) ABSTRACT

A method of operating an intraoral scanner. The intraoral scanner includes an image capturing device and a processor. The method includes the image capturing device sequentially capturing M images along a first dental arch, the processor establishing a first arch model of the first dental arch according to the M images, the image capturing device sequentially capturing N images along a straight-line path from a first anchor to a second anchor on the first dental arch, the processor generating first coordinates of the first anchor and second coordinates of the second anchor according to the N images, and the processor calibrating the first arch model according to the first coordinates and the second coordinates. The first anchor is located at one side of a dental midline of the first dental arch. The second anchor is located at the other side of the dental midline of the first dental arch.

20 Claims, 8 Drawing Sheets

ОPERATING INTRAORAL SCANNER CAPABLE OF CONSTRUCTING ACCURATE DENTAL MODEL AND METHOD THEREOF

CROSS REFERENCE TO RELATED APPLICATION

This non-provisional application claims priority of China patent application No. 202010203554.7, filed on 20 Mar. 2020, included herein by reference in its entirety.

BACKGROUND OF THE INVENTION

1. Field of the Invention

The invention relates to intraoral scanners, and in particular, to a method of operating an intraoral scanner.

2. Description of the Prior Art

An intraoral scanner employs laser light to scan teeth quickly, and then employs software to build a teeth model for medical personnel to perform teeth reconstruction, orthodontic treatments or other clinical applications. The teeth reconstruction may involve the use of dental braces, dental bridges, dental implants and other dentures to reconstruct missing or bad teeth. The orthodontic treatments utilize orthodontic devices to improve abnormal occlusion of teeth. Accurate teeth models are used to prepare suitable dentures or orthodontic devices to lower the risk of dental surgery.

However, the conventional scanning methods of the intraoral scanners are complicated, and external auxiliary devices are needed to obtain an accurate teeth model, being complicated in operation, time-consuming in configuring the devices, increasing discomfort of patients.

SUMMARY OF THE INVENTION

According to an embodiment of the invention, an intraoral scanner includes an image capturing device and a processor. A method of operating the intraoral scanner includes the image capturing device sequentially capturing M images along a first dental arch, the processor constructing a first arch model of the first dental arch according to the M images, the image capturing device sequentially capturing N images along a straight-line path between a first anchor point of the first dental arch to a second anchor point of the first dental arch, the processor generating first coordinates of the first anchor point and second coordinates of the second anchor point, and the processor correcting the first arch model according to the first coordinates and the second coordinates. The first anchor point is located at one side of a dental midline of the first dental arch. The second anchor point is located at the other side of the dental midline of the first dental arch. M and N are positive integers exceeding 1

According to another embodiment of the invention, an intraoral scanner includes an image capturing device and a processor coupled thereto. The image capturing device is used to sequentially capture M images along a first dental arch. The processor is used to construct a first arch model of the first dental arch according to the M images. The image capturing device is used to sequentially capture N images along a straight-line path between a first anchor point of the first dental arch to a second anchor point of the first dental arch. The processor is used to generate first coordinates of the first anchor point and second coordinates of the second anchor point, and corrects the first arch model according to the first coordinates and the second coordinates. The first anchor point is located at one side of a dental midline of the first dental arch. The second anchor point is located at the other side of the dental midline of the first dental arch. M and N are positive integers exceeding 1.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
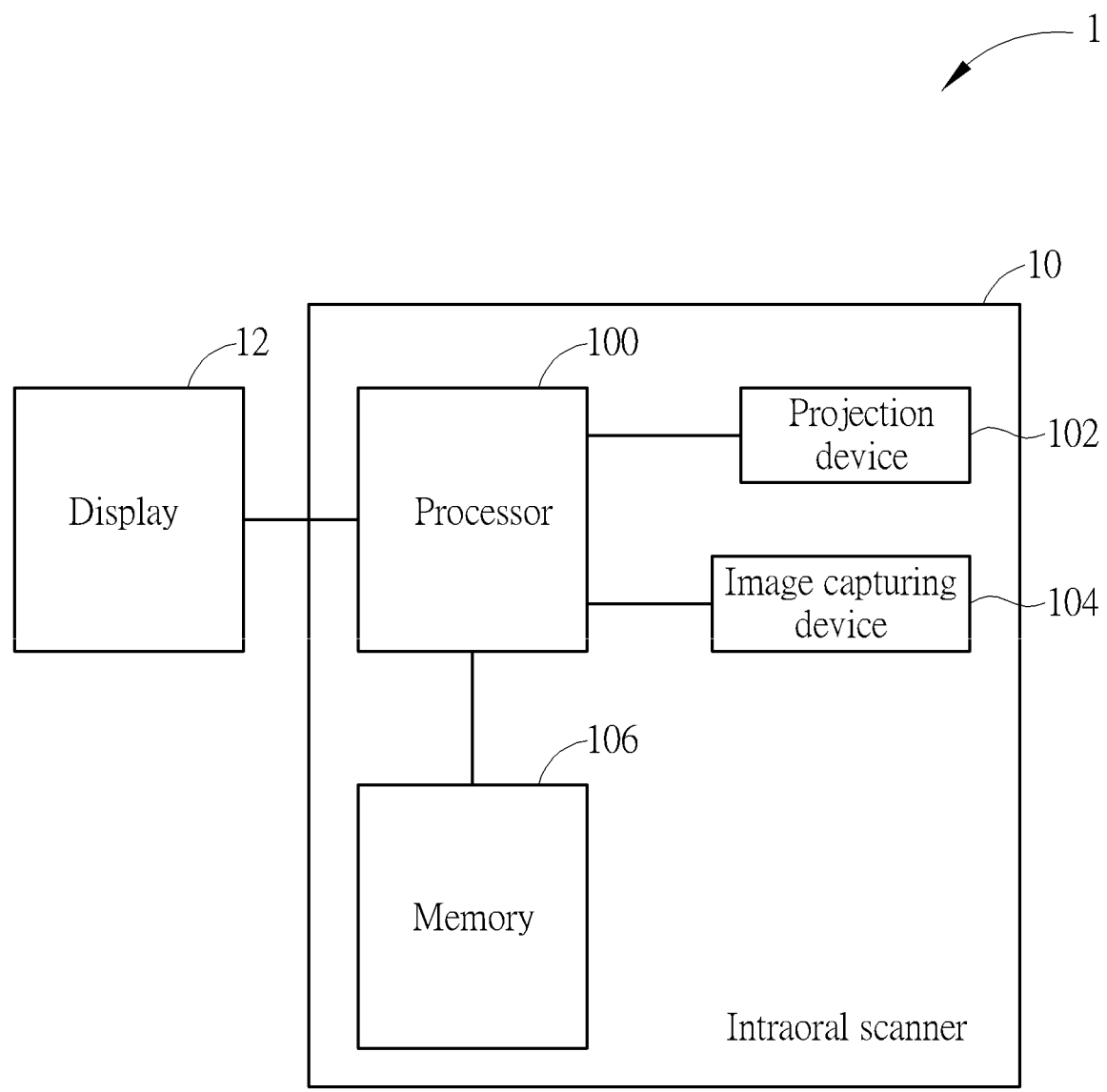
FIG. 1 is a block diagram of an intraoral scanner system according to an embodiment of the invention.

FIG. 1 is a block diagram of an intraoral scanner system 1 according to an embodiment of the invention. The intraoral scanner system 1 may include an intraoral scanner 10 and a display 12 coupled to each other. The intraoral scanner 10 may be a handheld intraoral scanner, and may be coupled to the display 12 via a wired or wireless connection. The intraoral scanner 10 may scan a patient's mouth according to a predetermined scanning path to accurately reconstruct a full-mouth three-dimensional (3D) teeth model. The display 12 may display the reconstructed 3D teeth model.

The intraoral scanner 10 may include a processor 100, a projection device 102, an image capturing device 104 and a memory 106. The processor 100 may be coupled to the projection device 102, the image capturing device 104, the memory 106 and the display 12 to operate the same. The projection device 102 may project a predetermined pattern onto an object along a predetermined scanning path. The image capturing device 104 may scan the object along the predetermined scanning path to obtain a plurality of two-dimensional (2D) images of the object having the predetermined pattern projected thereon. The object may be the entire first dental arch, a portion of the first dental arch, the entire second dental arch, a portion of the second dental arch, the entire buccal bite of the first dental arch and the second dental arch, or a portion of the buccal bite of the first dental arch and the second dental arch. In this embodiment, the first dental arch may be an upper dental arch, and the second dental arch may be a lower dental arch. In other embodiments, the first dental arch may be a lower dental arch, and the second dental arch may be an upper dental arch. The predetermined pattern may be a structured light pattern such as a grid, a stripe, a round pattern, a cross pattern, a gray code pattern, a color code pattern, other coding patterns or random patterns. When the predetermined pattern is projected onto the surface of the object of various shapes, patterns and/or depths, a deformation may occur. The 2D image may include a deformed predetermined pattern. The processor 100 may compute 3D location data of feature points on the surface of the object based on the original predetermined pattern and the deformed predetermined pattern, the 3D location data being referred to as a point cloud. The memory 106 may be a non-volatile memory such as a random access memory or a hard disk. The memory 106 may store images and point cloud data. The processor 100 may generate a plurality of sets of point clouds according to a plurality of 2D images, and merge the sets of point clouds using a merging algorithm and a post-processing program to generate a 3D model of the object.

Figure 2:
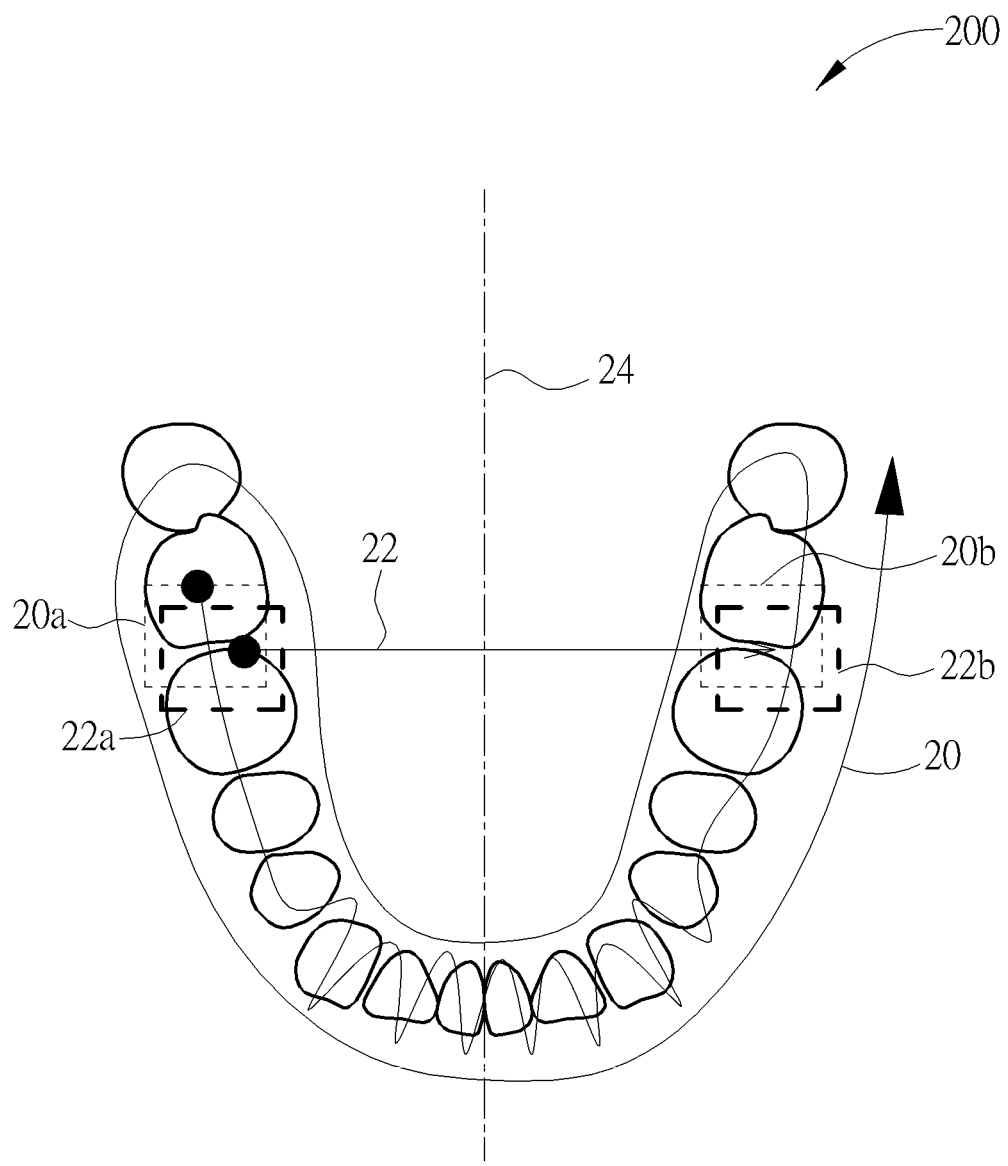
FIG. 2 is a schematic diagram of a first dental arch according to an embodiment of the invention.

FIG. 2 is a schematic diagram of the first dental arch 200 according to an embodiment of the invention. The intraoral scanner 10 may scan the first dental arch 200 according to a predetermined scanning path 20 to construct a first arch model, scan a horizontal portion model of the first dental arch according to a predetermined scanning path 22 to construct a horizontal portion model of the first dental arch, and correct the first arch model according to the horizontal portion model of the first dental arch. The predetermined scanning path 20 may include an occlusal path of the first dental arch 200, a lingual path of the first dental arch 200, and a buccal path of the first dental arch 200. The occlusal path of the first dental arch 200 may be a path opposite to an occlusal surface of the second dental arch. The predetermined scanning path 22 may be a straight-line path from the first anchor point 22a of the first dental arch 200 to the second anchor point 22b of the first dental arch 200. A horizontal portion model of the first dental arch may be a horizontal cross-sectional portion cutting through the first anchor point 22a of the first dental arch 200 to the second anchor point 22b of the first dental arch 200. The first anchor point 22a may be located at one side of the dental midline 24 of the first dental arch 200, and the second anchor point 22b may be located at the other side of the dental midline 24. The first anchor point 22a and the second anchor point 22b may be respectively in proximity to two posterior teeth of the first dental arch 200, and the two posterior teeth may be premolars or molars. For example, the first anchor point 22a and the second anchor point 22b may be two directly opposite molars in the first dental arch 200, respectively. In other examples, the first anchor point 22a and the second anchor point 22b may be two arbitrary opposite molars of the first dental arch 200, respectively. The intraoral scanner 10 may scan along the predetermined scan path 20 in single pass, multiple passes or by segments to construct the first arch model. Similarly, the intraoral scanner 10 may scan along the predetermined scan path 22 in single pass or multiple passes to construct the horizontal portion model of the first dental arch 200. In some embodiments, the intraoral scanner 10 may scan a plurality of predetermined scanning paths 22 to construct a plurality of sets of horizontal portion models of the first dental arch 200, and each predetermined scanning path 22 may be a straight-line path between two arbitrary anchor points at both sides of the dental midline 24 of the first dental arch 200, so as to correct the first arch model according to the plural sets of horizontal portion models of the first dental arch 200.

Since the first anchor point 22a and the second anchor point 22b in the predetermined scanning path 22 overlap with the two corresponding anchor points 20a, 20b in the predetermined scanning path 20, the processor 100 may align the anchor points 20a, 20b of the first arch model to the first anchor point 22a and the second anchor point 22b, respectively, so as to correct the first arch model. When constructing the first arch model, the image capturing device 104 may sequentially capture M images along the first dental arch 200 according to the predetermined scanning path 20, M being a positive integer greater than 1, and the processor 100 may generate M sets of point clouds according to the M images, and merge the M sets of point clouds to generate a first dental arch point cloud to serve as the first arch model. The processor 100 may use the iterative closest point (ICP) algorithm to match each newly added first dental arch point cloud to the established first arch point cloud set to successively merge the M sets of point clouds and generate a first arch point cloud set. Similarly, when constructing the horizontal portion model of the first dental arch 200, the image capturing device 104 may sequentially capture N images along the predetermined scanning path 22, N being a positive integer greater than 1, and the processor 100 may generate N sets of point clouds according to the N images, and merge the N sets of point clouds to generate a point cloud set of the horizontal portion model of the first dental arch to 200 serve as the horizontal portion model of the first dental arch 200. The image capturing device 104 may sequentially capture the N images along the straight-line path from the first anchor point 22a on the first occlusal surface to the second anchor point 22b on the second occlusal surface. The first occlusal surface and the second occlusal surface of the first dental arch 200 may be opposite to the corresponding occlusal surfaces of the second dental arch. In some embodiments, the first occlusal surface and the second occlusal surface of the first dental arch 200 may occlude the corresponding occlusal surfaces of the second dental arch. The memory 106 may store the first arch point cloud set, the corrected first arch point cloud set, and the point cloud set of the horizontal portion model of the first dental arch 200.

Figure 3:
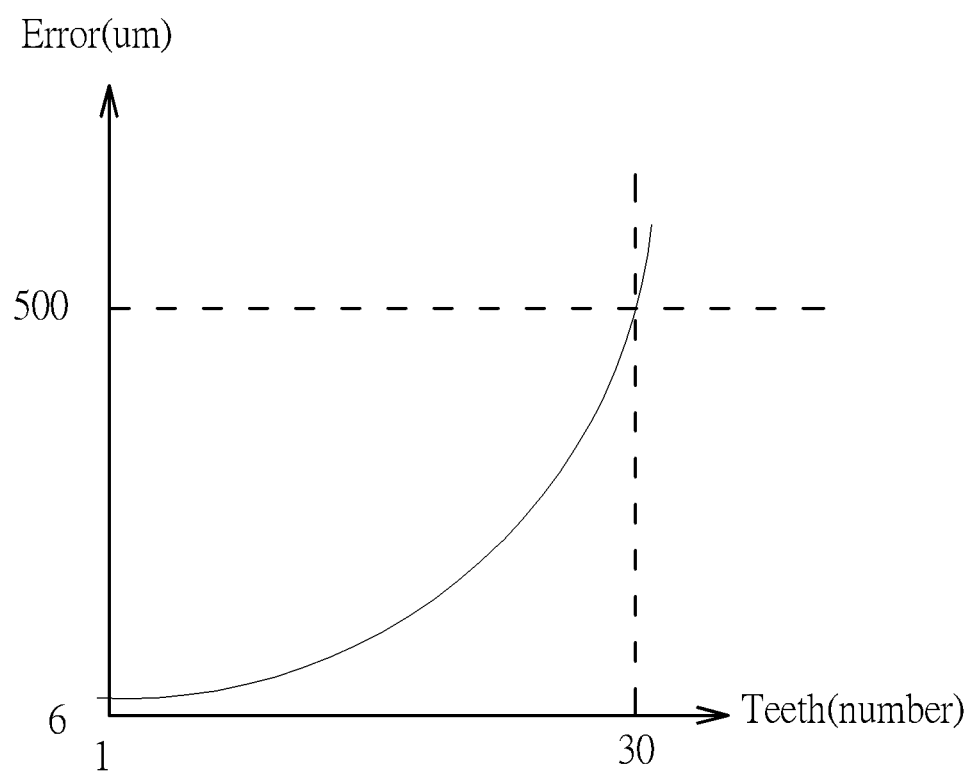
FIG. 3 shows the relationship between a scan length and an error in a teeth model.

Each point cloud merging may generate an error, and the error may increase with the number of times of merging the point clouds. FIG. 3 shows the relationship between a scan length and an error in a teeth model, wherein the horizontal axis represents the number of teeth and the vertical axis represents the error. The error will increase exponentially with the number of teeth. The error caused by merging point clouds of 30 teeth may be about 500 microns. Since the length of the predetermined scanning path 20 may be much longer than the length of the predetermined scanning path 22, the error of the first dental arch point cloud set may be much larger than the error of the point cloud set of the horizontal portion model of the first dental arch 200. Compared to the predetermined scanning path 20, the predetermined scanning path 22 is shorter in length, the texture of the scanned surface is simpler, and the rotation in the scanning process is less, and therefore, the point cloud set of the horizontal portion model of the first dental arch 200 is more accurate.

The point cloud set of the horizontal portion model of the first dental arch 200 includes the first coordinates of the first anchor point 22a and the second coordinates of the second anchor point 22b. The processor 100 may use a 3D point cloud registration algorithm such as a random sample consensus (RANSAC) algorithm to find the first coordinates of the first anchor point 22a and the second coordinates of the second anchor point 22b from the point cloud set of the horizontal portion model of the first dental arch 200, find the coordinates of the anchor points 20a, 20b from the first arch point cloud set, and then employ the merging algorithm such as the ICP algorithm to accurately register the anchor points 20a, 20b of the first arch point cloud set to the first coordinates of the first anchor point 22a and the second coordinates of the second anchor point 22b, respectively. The processor 100 may find a relative rotational transformation matrix R and a relative translational transformation matrix T to best match the first arch point cloud set to the point cloud set of the horizontal portion model of the first dental arch 200 using the ICP algorithm, and overlay the anchor points 20a and 20b of the first arch point cloud set on the first coordinates of the first anchor point 22a and the second coordinates of the second anchor point 22b according to the relative rotation relationship matrix R and the relative translation relationship matrix T, respectively. Then the processor 100 may apply a point cloud global optimization algorithm to the first dental arch point cloud, or sequentially adjust the remaining data points of the first dental arch point cloud starting from the anchor points 20a, 20b, so as to correct the first arch model.

Figure 4:
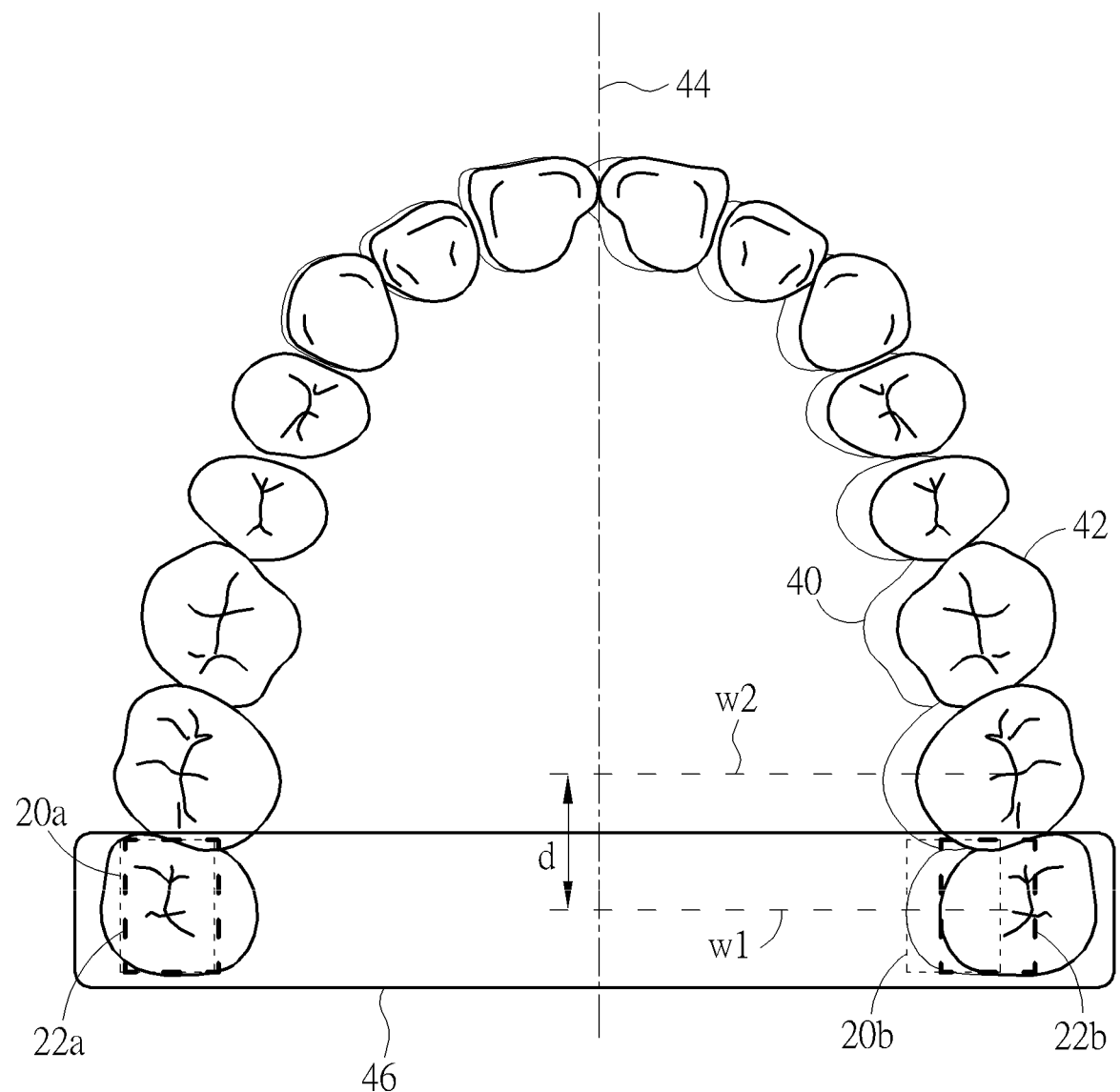
FIG. 4 shows a schematic diagram of an uncorrected first arch model, a corrected first arch model, and a horizontal portion model of a first dental generated by the intraoral scanner in FIG. 1.

FIG. 4 shows a schematic diagram of an uncorrected first arch model 40, a corrected first arch model 42, and the horizontal portion model 46 of the first dental arch 200 generated by the intraoral scanner 10. The horizontal portion model 46 has the first anchor point 22a and the second anchor point 22b. The uncorrected first arch model 40 includes corresponding anchor points 20a, 20b. First, the processor 100 may register the anchor points 20a, 20b to the first anchor point 22a and the second anchor point 22b respectively to generate two corrected anchor points of the corrected first arch model 42, the two corrected anchor points may be located at the first coordinates of the first anchor point 22a and the second coordinates of the second anchor point 22b, respectively. The processor 100 may generate the dental midline 44 of the corrected first arch model 42 according to the midpoint between the first coordinates and the second coordinates, and the dental midline 44 is a line perpendicular to a straight line passing through the first anchor point 22a and the second anchor point 22b. The processor 100 may correct a position of a tooth in the first arch model 40 according to the dental midline 44 and the first coordinates or the second coordinates. For example, the processor 100 may compute a horizontal distance w1 from the second coordinates to the dental midline 44, compute a vertical distance d from the second coordinates to a data point of the uncorrected first arch model 40, compute a horizontal distance w2 in a proportional manner according to the horizontal distance w1 and the vertical distance d, and correct the data point of the uncorrected first arch model 40 according to the horizontal distance w2. The processor 100 may scale the remaining data points of the first arch model 40 according to the above method to generate the corrected first arch model 42. Since the errors are evenly distributed to individual data points in the first dental arch point cloud via the anchor point registration, the corrected first arch model 42 is highly accurate.

Figure 5:
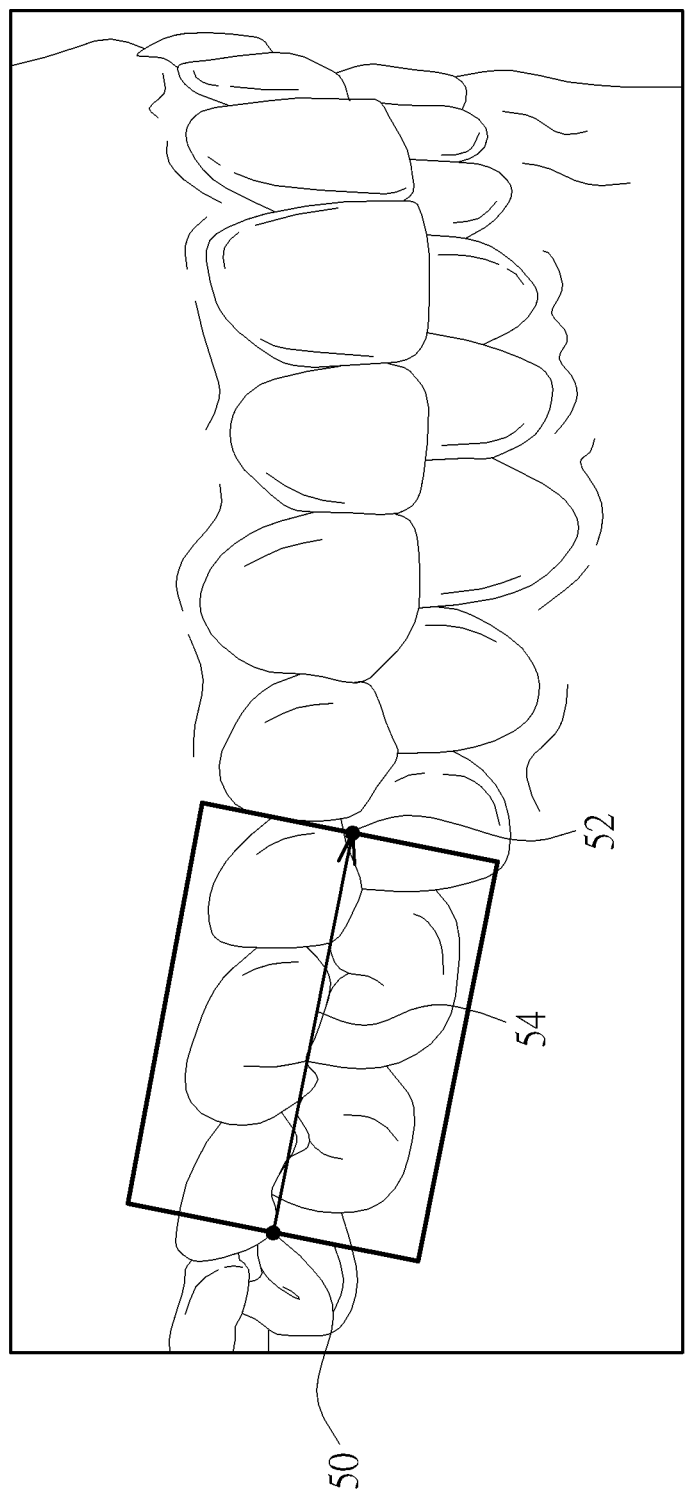
FIG. 5 shows a schematic diagram of a method of the image capturing device in FIG. 1 scanning along a teeth alignment path.

Then, the intraoral scanner 10 may scan the second dental arch to construct a second arch model, scan the buccal bit to create a buccal bite model, and correct the second arch model based on the corrected first arch model and the buccal bite model. The buccal bite model may be a model when the first dental arch and the second dental arch are aligned or closed. When constructing the second arch model, the image capturing device 104 may sequentially capture P images along the second dental arch according to the predetermined scanning path 20, P being a positive integer greater than 1, and the processor 100 may generate P sets of point clouds according to the P images, and merge the P sets of point clouds to generate a second dental arch point cloud to serve as the second arch model. When constructing the buccal bite model, the image capturing device 104 may sequentially capture Q images including a portion of the first dental arch 200 and a portion of the second dental arch along a teeth alignment path, Q being a positive integer, and the processor 100 may generate Q sets of point clouds according to the Q images, and merge the Q sets of point clouds to generate a buccal bite point cloud set to serve as the buccal bite model. The memory 106 may store the second arch point cloud set, the corrected second arch point cloud set, and the buccal bite point cloud set. The teeth alignment path may be a buccal bite path of a portion of the first dental arch 200 and a portion of the second dental arch. FIG. 5 shows a schematic diagram of a method of the image capturing device 104 scanning along a teeth alignment path 54. The image capturing device 104 may scan along the teeth alignment path 54 from positions 50 to 52 to generate Q images. The buccal bite model may include a left buccal bite model, a right buccal bite model, and/or a front buccal bite model. The left buccal bite model may be a model representing the first dental arch 200 and the second dental arch on the left side of the dental midline when the first dental arch 200 and the second dental arch are aligned or occluded. The right buccal bite model may be a model representing the first dental arch 200 and the second dental arch on the right side of the dental midline when the first dental arch 200 and the second dental arch are aligned or occluded. The front buccal bite model may be a model representing the anterior teeth of the first dental arch 200 and the anterior teeth of the second dental arch when the first dental arch 200 and the second dental arch are aligned or occluded. The anterior teeth may be incisors and canine teeth.

Figure 6:
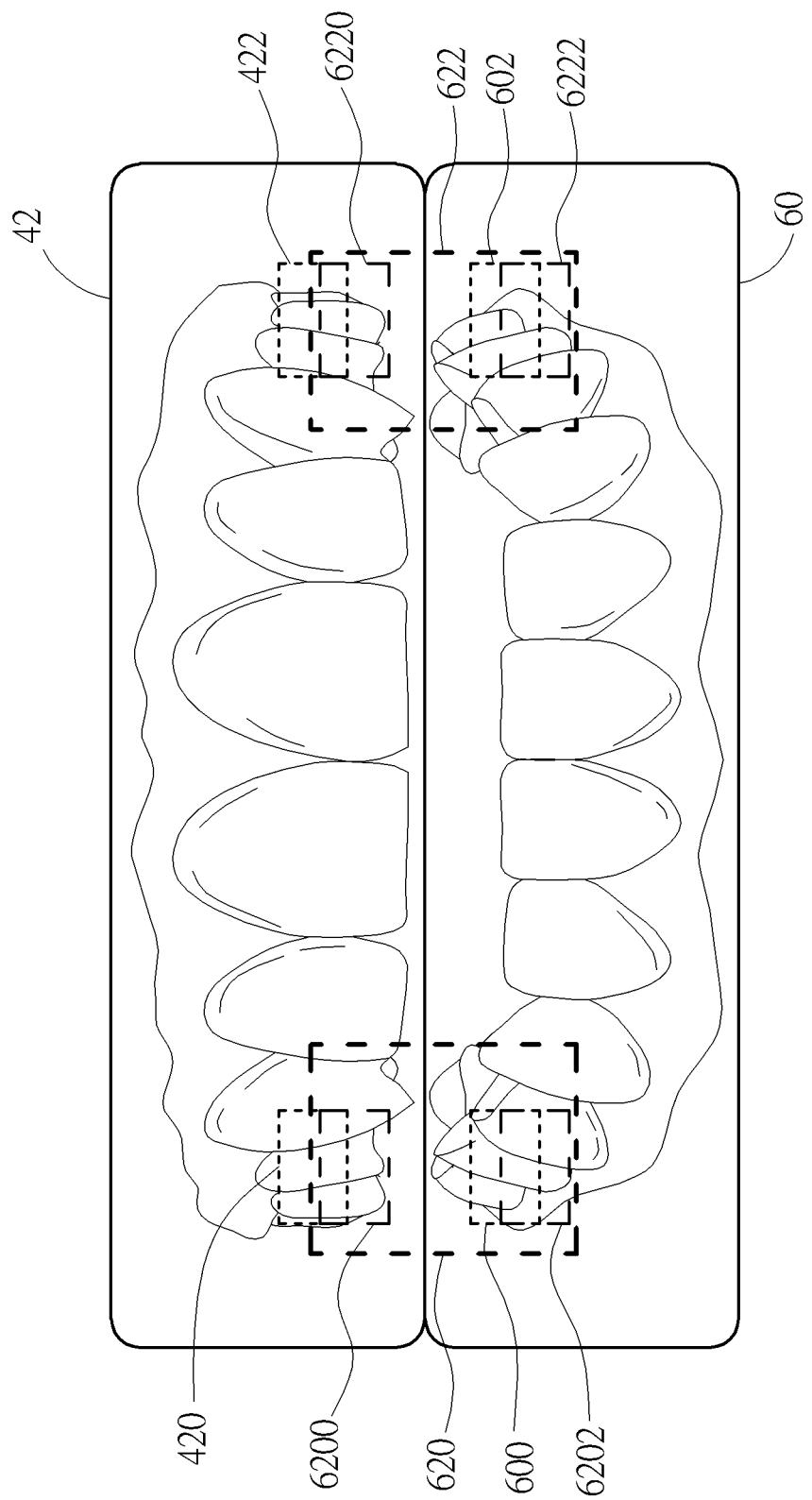
FIG. 6 shows a schematic diagram of a method of aligning the corrected first arch model and the second arch model.

FIG. 6 shows a schematic diagram of aligning the corrected first arch model 42 and the second uncorrected arch model 60 using the left buccal bite model 620 and the right buccal bite model 622. The left buccal bite model 620 may include an anchor point 6200 of the first dental arch 200 and an anchor point 6202 of the second dental arch aligned thereto, and the right buccal bite model 622 may include an anchor point 6220 of the first dental arch 200 and an anchor point 6222 of the second dental arch aligned thereto. The corrected first arch model 42 may include an anchor point 420 and an anchor point 422. The second arch model 60 may include an anchor point 600 and an anchor point 602. The processor 100 may determine that the anchor point 420 of the corrected first arch model 42 corresponds to the anchor point 6200 of the left buccal bite model 620, and the anchor point 600 of the second arch model 60 corresponds to the anchor point 6202 of the left buccal bite model 620, and align the anchor point 420 of the corrected first arch model 42 to the anchor point 600 of the uncorrected second arch model 60. Similarly, the processor 100 may determine that the anchor point 422 of the corrected first arch model 42 corresponds to the anchor point 6220 of the right buccal bite model 622, and the anchor point 602 of the uncorrected second arch model 60 corresponds to the anchor point 6222 of the right buccal bite model 622, and align the anchor point 422 of the corrected first arch model 42 to the anchor point 602 of the uncorrected second arch model 60. Then, the processor 100 may perform global optimization on the uncorrected second arch model 60 to obtain a corrected second arch model. Later, the processor 100 may remove the point cloud set of the horizontal portion model of the first dental arch 200 and the buccal bite point cloud set from the memory 106, and the display 12 may display a full-mouth model including the corrected first arch model 42 and the corrected second arch model.

In some embodiments, the intraoral scanner 10 may determine whether to fill image data of soft tissues of the upper and lower jaws into the corrected first arch model 42 and the corrected second arch model based on user settings.

In some embodiments, the intraoral scanner 10 may generate two 3D models. The first 3D model is a real-time point cloud set, and the second 3D model is a high-precision point cloud set. The real-time point cloud set is less accurate than the high-precision point cloud set. For example, the real-time point cloud set may include the uncorrected first arch model 40 and the uncorrected second arch model 60, and the high-precision point cloud set may include the corrected first arch model 42 and the corrected second arch model. During the scanning process of the scanning intraoral scanner 10, the display 12 may first display the real-time point cloud set, so that the operator may visually observe the latest state of the 3D model and the corresponding position of the intraoral scanner 10. The high-precision point cloud set may be generated by the registration algorithm and the matching algorithm requiring intensive and time-consuming computations, and consuming a lot of processor resources. In some embodiments, the high-precision point cloud set is generated and output only after a full-mouth scan is completed.

The intraoral scanner 10 generates an accurate horizontal portion model 46 of the first dental arch 200 by scanning the predetermined scanning path 22 of the first dental arch 200, correcting the first arch model 200 according to the horizontal portion model 46 of the first dental arch 200, scanning the buccal bite of the first dental arch 200 and the second dental arch to generate the buccal bite model, and correcting the uncorrected second arch model 60 according to the corrected first arch model 42 and the buccal bite model, thereby increasing an accuracy of the full-mouth model in a quick and effective manner without employing external positioning devices or complex scanning protocols.

Figure 7:
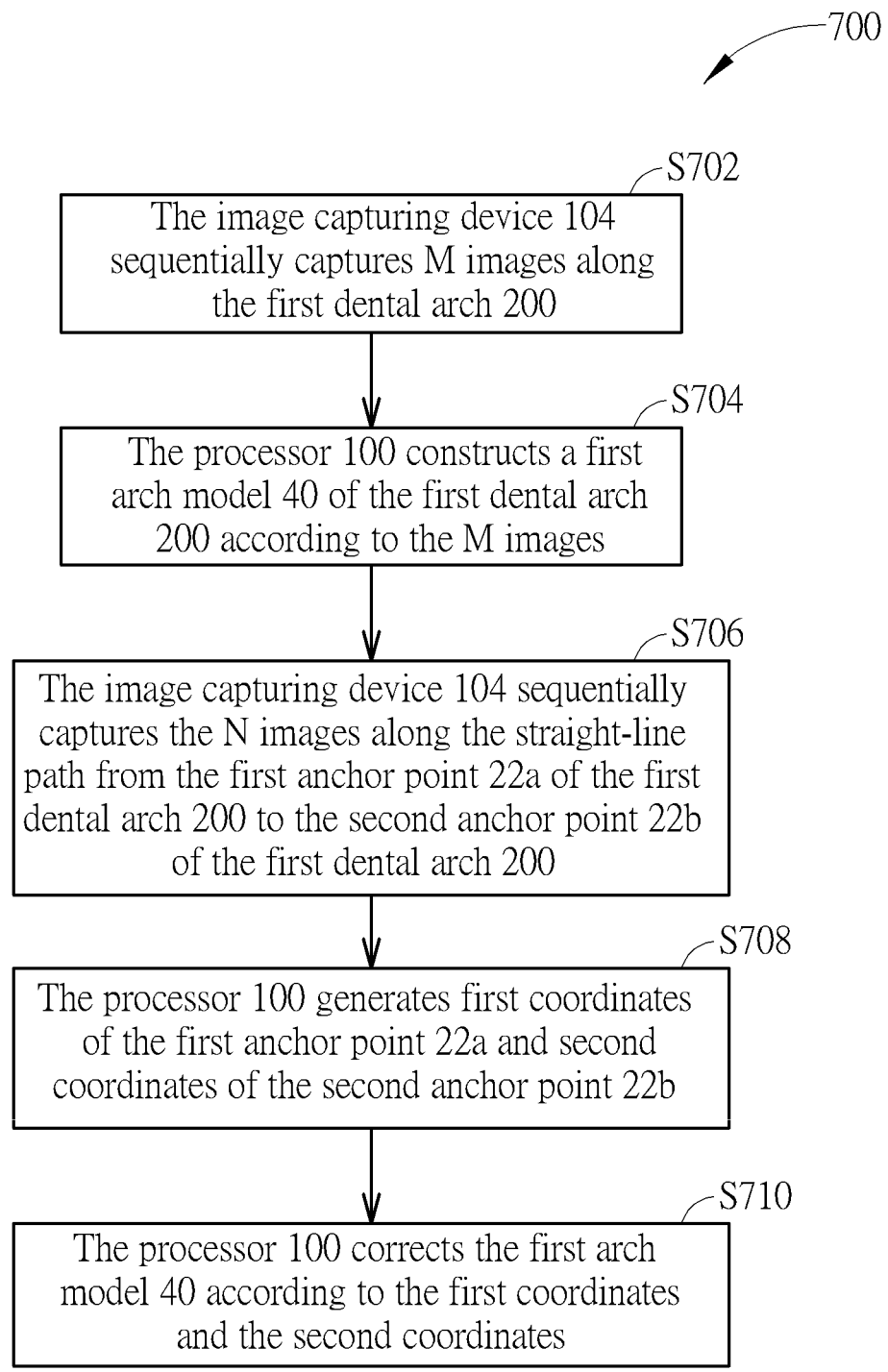
FIG. 7 is a flowchart of a method of operating the intraoral scanner in FIG. 1.

FIG. 7 is a flowchart of a method 700 of operating the intraoral scanner 10. The method 700 includes Steps S702 to S710, and is used to correct the first arch model according to the horizontal portion models of the first dental arch to generate a corrected first arch model. Any reasonable step change or adjustment is within the scope of the disclosure. Steps S702 to S710 are detailed as follows:

Step S702: The image capturing device 104 sequentially captures M images along the first dental arch 200;

Step S704: The processor 100 constructs a first arch model 40 of the first dental arch 200 according to the M images;

Step S706: The image capturing device 104 sequentially captures the N images along the straight-line path from the first anchor point 22a of the first dental arch 200 to the second anchor point 22b of the first dental arch 200;

Step S708: The processor 100 generates first coordinates of the first anchor point 22a and second coordinates of the second anchor point 22b;

Step S710: The processor 100 corrects the first arch model 40 according to the first coordinates and the second coordinates.

The method 700 generates an accurate horizontal portion model of the first dental arch 200 by scanning the predetermined scanning path 22 of the first dental arch 200, and correcting the first arch model 200 according to the horizontal portion model 46 of the first dental arch 200, thereby increasing the accuracy of the first arch model in a quick and effective manner without employing external positioning devices or complex scanning protocols.

Figure 8:
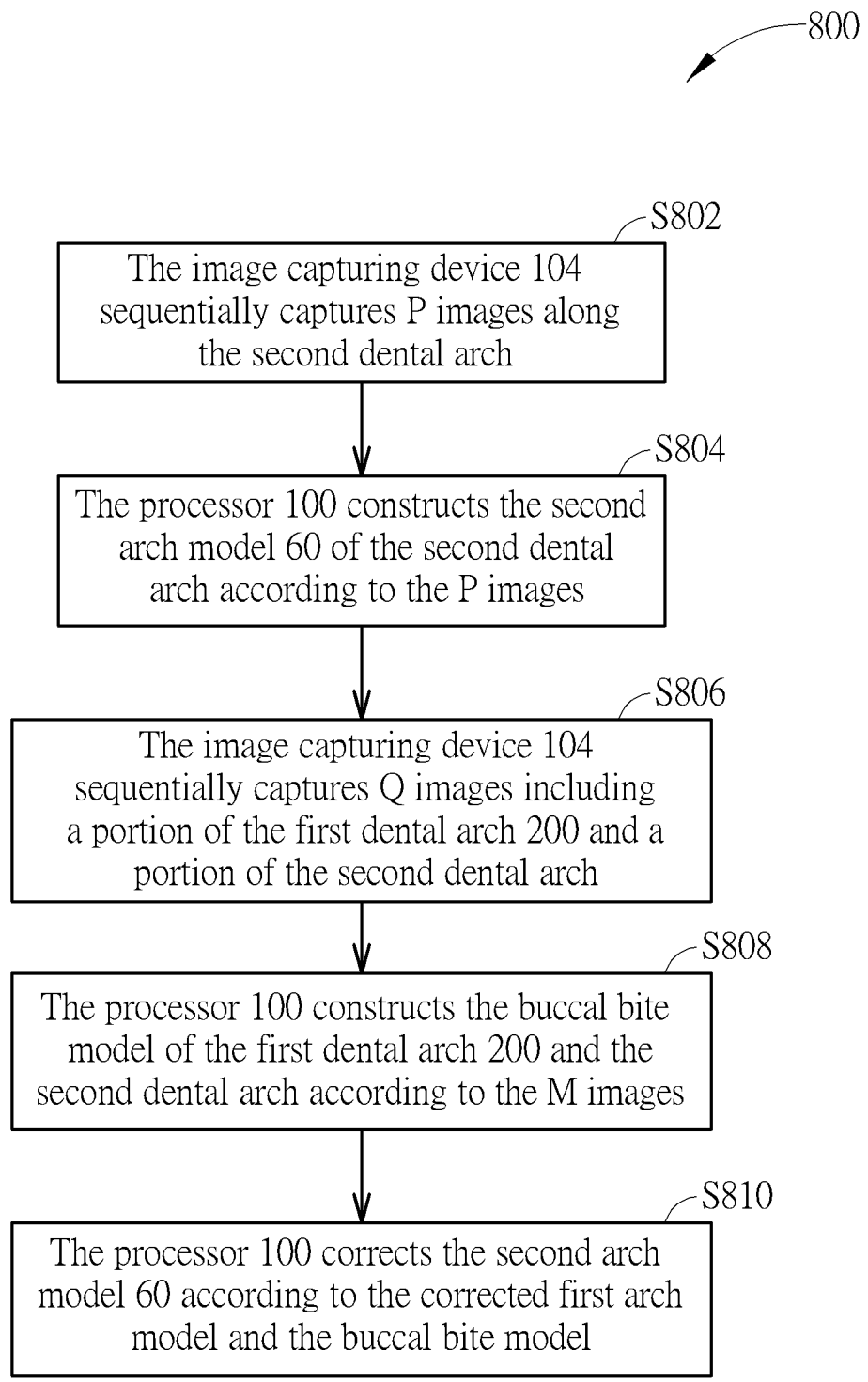
FIG. 8 is a flowchart of another method of operating the intraoral scanner in FIG. 1.

FIG. 8 is a flowchart of another exemplary method 800 of operating the intraoral scanner 1. The method 800 includes Steps S802 to S810, and is used to correct the second arch model according to the corrected first arch model and the buccal bite model to generate an accurate corrected second arch model. Any reasonable step change or adjustment is within the scope of the disclosure. Steps S802 to S810 are detailed as follows:

Step S802: The image capturing device 104 sequentially captures P images along the second dental arch;

Step S804: The processor 100 constructs the second arch model 60 of the second dental arch according to the P images;

Step S806: The image capturing device 104 sequentially captures Q images including a portion of the first dental arch 200 and a portion of the second dental arch;

Step S808: The processor 100 constructs the buccal bite model of the first dental arch 200 and the second dental arch according to the M images;

Step S810: The processor 100 corrects the second arch model 60 according to the corrected first arch model and the buccal bite model.

The method 800 may be performed after the method 700. The method 800 corrects the second arch model according to the corrected first arch model and the buccal bite model, increasing the accuracy of the second arch model and the full-mouth model in a quick and effective manner without employing external positioning devices or complex scanning protocols.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of operating an intraoral scanner, the intraoral scanner comprising an image capturing device and a processor, the method comprising:
the image capturing device sequentially capturing M images along a first dental arch, M being a positive integer exceeding 1;
the processor constructing a first arch model of the first dental arch according to the M images;
the image capturing device sequentially capturing N images along a straight-line path between a first anchor point of the first dental arch to a second anchor point of the first dental arch, the first anchor point being located at one side of a dental midline of the first dental arch, the second anchor point being located at another side of the dental midline of the first dental arch, N being a positive integer exceeding 1;
the processor generating first coordinates of the first anchor point and second coordinates of the second anchor point; and
the processor correcting the first arch model according to the first coordinates and the second coordinates.

2. The method of claim 1, further comprising:
the image capturing device sequentially capturing P images along a second dental arch, P being a positive integer exceeding 1;
the processor constructing a second arch model of the second dental arch according to the P images;

the image capturing device sequentially capturing Q images including a portion of the first dental arch and a portion of the second dental arch, Q being a positive integer;

the processor constructing a buccal bite model of the first dental arch and the second dental arch according to the Q images; and the processor correcting the second arch model according to the corrected first arch model and the buccal bite model.

3. The method of claim 2, wherein the image capturing device sequentially capturing the Q images including the portion of the first dental arch and the portion of the second dental arch comprises:

the image capturing device sequentially capturing the Q images including the portion of the first dental arch and the portion of the second dental arch along a teeth alignment path.

4. The method of claim 3, wherein the teeth alignment path is a buccal bite path of the portion of the first dental arch and the portion of the second dental arch.

5. The method of claim 2, wherein the buccal bite model comprises a left buccal bite model and a right buccal bite model.

6. The method of claim 2, wherein the first dental arch is an upper dental arch and the second dental arch is a lower dental arch.

7. The method of claim 1, wherein the image capturing device sequentially capturing the N images along the straight-line path between the first anchor point of the first dental arch to the second anchor point of the first dental arch comprises:

the image capturing device sequentially capturing the N images along the straight-line path between the first anchor point on a first occlusal surface to the second anchor point on a second occlusal surface.

8. The method of claim 1, wherein the processor correcting the first arch model according to the first coordinates and the second coordinates comprises:

the processor adjusting a position of a tooth in the first arch model according to the dental midline and the first coordinates or the second coordinates.

9. The method of claim 1, wherein the first anchor point and the second anchor point are respectively close to two molars of the first dental arch.

10. The method of claim 9, wherein the two molars are opposite to each other.

11. An intraoral scanner comprising:
an image capturing device; and
a processor coupled to the image capturing device;
wherein the image capturing device is configured to sequentially capture M images along a first dental arch, M being a positive integer exceeding 1;
the processor is configured to construct a first arch model of the first dental arch according to the M images;
the image capturing device is further configured to sequentially capture N images along a straight-line path between a first anchor point of the first dental arch to a second anchor point of the first dental arch, the first anchor point being located at one side of a dental midline of the first dental arch, the second anchor point being located at another side of the dental midline of the first dental arch, N being a positive integer exceeding 1; and
the processor is further configured to generate first coordinates of the first anchor point and second coordinates of the second anchor point, and corrects the first arch model according to the first coordinates and the second coordinates.

12. The intraoral scanner of claim 11, wherein:
the image capturing device is further configured to sequentially capture P images along a second dental arch, P being a positive integer exceeding 1;
the processor is further configured to construct a second arch model of the second dental arch according to the P images;
the image capturing device is further configured to sequentially capture Q images including a portion of the first dental arch and a portion of the second dental arch, Q being a positive integer; and
the processor is further configured to construct a buccal bite model of the first dental arch and the second dental arch according to the Q images, and correct the second arch model according to the corrected first arch model and the buccal bite model.

13. The intraoral scanner of claim 12, wherein the image capturing device is configured to sequentially capture the Q images including the portion of the first dental arch and the portion of the second dental arch along a teeth alignment path.

14. The intraoral scanner of claim 13, wherein the teeth alignment path is a buccal bite path of the portion of the first dental arch and the portion of the second dental arch.

15. The intraoral scanner of claim 12, wherein the buccal bite model comprises a left buccal bite model and a right buccal bite model.

16. The intraoral scanner of claim 12, wherein the first dental arch is an upper dental arch and the second dental arch is a lower dental arch.

17. The intraoral scanner of claim 11, wherein the image capturing device is further configured to sequentially capture the N images along the straight-line path between the first anchor point on a first occlusal surface to the second anchor point on a second occlusal surface.

18. The intraoral scanner of claim 11, wherein the processor is configured to adjust a position of a tooth in the first arch model according to the dental midline and the first coordinates or the second coordinates.

19. The intraoral scanner of claim 11, wherein the first anchor point and the second anchor point are respectively close to two molars of the first dental arch.

20. The intraoral scanner of claim 19, wherein the two molars are opposite to each other.

* * * * *